United States Patent

Renner et al.

[11] Patent Number: 5,259,713
[45] Date of Patent: Nov. 9, 1993

[54] BLIND RIVET NUT WITH PULLING MANDREL

[75] Inventors: Wolf Renner, Giessen; Dieter Mauer, Lollar, both of Fed. Rep. of Germany

[73] Assignee: Emhart Inc., Newark, Del.

[21] Appl. No.: 818,948

[22] Filed: Jan. 10, 1992

[30] Foreign Application Priority Data

Jan. 11, 1991 [DE] Fed. Rep. of Germany ....... 4100709

[51] Int. Cl.⁵ .................. F16B 13/04; F16B 37/04
[52] U.S. Cl. ............................ 411/34; 411/55; 411/183; 470/29
[58] Field of Search ............. 411/34-38, 411/43, 55, 177, 183; 470/29, 30

[56] References Cited

U.S. PATENT DOCUMENTS

| 2,148,977 | 2/1939 | Buck | 411/38 |
| 2,188,422 | 1/1940 | Waner | 411/34 |
| 2,392,133 | 1/1946 | Eklund | 411/34 |
| 2,887,926 | 5/1959 | Edwards | 411/38 |

FOREIGN PATENT DOCUMENTS

| 241038 | 4/1960 | Australia | 411/34 |
| 45-34333 | 11/1970 | Japan | 411/38 |

*Primary Examiner*—Neill R. Wilson
*Attorney, Agent, or Firm*—Edward D. Murphy

[57] ABSTRACT

A blind rivet nut with a pulling mandrel, having a flanged rivet tube with an internal thread has the pulling mandrel in the form of a cap screw, the cap being used to engage a setting tool. The cap screw is preferably a thread-cutting screw.

5 Claims, 1 Drawing Sheet

BLIND RIVET NUT WITH PULLING MANDREL

BACKGROUND OF THE INVENTION

The invention relates to a blind rivet nut with pulling mandrel having a rivet tube with a flange, which is provided on its side remote from the flange with an internal thread extending from the end of the rivet tube via a portion of the rivet tube to a clinch zone of the rivet tube which is enlarged by means of a pulling mandrel fitting into the internal thread when the blind rivet nut is set, such that a workpiece receiving the blind rivet nut is clamped by the flange and the enlargement.

A blind rivet nut of this type is known from European Patent Application 158 304. For setting this blind rivet nut a particular pulling mandrel is used which pertains to the setting tool and is provided at its end extending into the internal thread of the blind rivet nut with an external thread fitting into the internal thread of the blind rivet nut and extending over the length thereof so that the pulling mandrel is capable of exerting a pulling force over the length of the internal thread on the rivet tube and of enlarging it in the region of its clinch zone. During the setting of the blind rivet nut, an opposing force is exerted on the flange of the rivet tube by a pressure piece penetrated by the pulling mandrel so that the force acting on the pulling mandrel can act fully on the clinch zone of the rivet tube, the pulling mandrel sliding, as during the setting of a conventional blind rivet, through the pressure piece formed by the setting tool during the setting of a conventional blind rivet. A workpiece, such for example as a sheet metal plate penetrated by the blind rivet nut, is clamped during this setting process so that the set blind rivet nut is therefore riveted. The workpiece is clamped between the flange of the rivet tube on the one hand and the enlargement of the rivet tube on the other hand. After the blind rivet nut has been set, the special pulling mandrel is screwed out of the blind rivet nut so that the blind rivet nut is available for screwing-in of a suitable bolt.

A voluminous prior art exists relating to blind rivet nuts. The embodiment described hereinbefore is to the fore and the same setting process is employed (see European Patent Applications 305868, 264870, U.S. Pat. Nos. 2409352, 3948142, 2565019, 3461771, GB-PS 1205744, DE-OS 3240539).

The object of the invention is to design a blind rivet nut with pulling mandrel so as substantially to simplify the processing thereof.

BRIEF DESCRIPTION OF THE INVENTION

According to the present invention, a blind rivet nut with a pulling mandrel having a rivet tube with flange which is provided on its side remote from the flange with an internal thread extending from the end of the rivet tube via a portion of the rivet tube to a clinch zone of the rivet tube which is enlarged when the blind rivet nut is set by means of the pulling mandrel fitting into the internal thread such that a workpiece receiving the blind rivet nut is clamped by the flange and the enlargement is characterised in that the pulling mandrel is constructed as a cap screw which is prefitted in the blind rivet nut and of which the cap forms the abutment for a setting tool.

The use of the prefitted cap screw as a pulling mandrel initially affords the significant advantage that the blind rivet nut inserted into a corresponding hole in a workpiece is already provided with a pulling mandrel so that need to twist a special pulling mandrel into the blind rivet nut inserted into the hole is eliminated. The setting tool can therefore set immediately on the prefitted cap screw. This results in a combined effect whereby the cap of the cap screw can be utilised as an abutment for the setting tool. The need for firm clamping of the pulling mandrel in the setting tool, as normal with conventional blind rivets, is eliminated. The setting tool merely requires claws which grip behind the cap of the prefitted cap screw forming the abutment, without a special pressure having to be exerted on the shank of the cap screw. In addition, the cap screw utilised as a pulling mandrel can then remain for the subsequent fixing of a further workpiece as a fastening screw in the set blind rivet nut. The processing of the blind rivet nut with pulling mandrel is therefore very simple and is eminently suitable for the automatic setting of blind rivet nuts which is a condition for the use of blind rivet nuts, for example in the car industry, where automation of the individual production phases and therefore also the automatic supply are in the fore and are substantially simplified by the combination of blind rivet nut and pulling mandrel. Even if the set blind rivet nut is subsequently to be provided with a different screw and the prefitted cap screw is therefore to be screwed out some time after the setting operation, this does not affect the advantageous processing of the blind rivet nut, as the screwing-in and -out of a special pulling mandrel pertaining to the setting tool, necessary when using the prior art, is eliminated in any case.

In addition, reference should also be made to German Gebrauchsmuster G90 01 069.8 relating to a blind rivet nut which is set by means of a fastening screw screwed into the blind rivet nut. The blind rivet nut is provided with a rivet tube of elastic material, more specifically rubber, into which a pipe provided with an internal thread is inserted. The pipe is rigidly connected to the rubber tube, for example by vulcanisation. As the fastening screw is tightened, the rubber tube is compressed and forms a bead which is set behind the workpiece carrying the blind rivet nut, forming a clamp which consists, on the one hand, of the head and, on the other hand, of a flange closing the rubber tube. This blind rivet nut can be detached from its workpiece again when released by turning back the fastening screw and can therefore be used several times. Owing to the use of the elastic rubber tube, it does not form a rigid connection to the workpiece. Owing to the need to use an elastic rubber tube, this known blind rivet nut is not comparable to the blind rivet nut with pulling mandrel according to the invention. Furthermore, the known blind rivet nut has to be set by the tightening of the fastening screw, and the blind rivet nut is immediately detached from the workpiece carrying it when the fastening screw is loosened. Owing to this feature of the setting of the known blind rivet nut, the art forming the basis thereof follows a path deviating from the blind rivet nut according to the invention since the setting of a blind rivet nut with a pulling mandrel which remains freely rotatable in the blind rivet nut after the setting operation is not possible therewith owing to the special design of the known blind rivet nut. In this respect, therefore, there is a further fundamental difference between the known blind rivet nut and the blind rivet nut with pulling mandrel according to the invention.

The cap screw in accord with this invention is a thread-cutting screw which hollows out the thread in the rivet tube during the prefitting operation. With this design, therefore, the hollowing out of the thread coincides with the turning-in of the pulling mandrel and this substantially simplifies the production of the unit consisting of "blind rivet nut with pulling mandrel".

To enable the cap screw to exert, over an adequate length, the pulling force which is to be transmitted by it onto the rivet tube during the setting operation without impairing the fastening of a component on the workpiece, which is necessary after the setting of the blind rivet nut, the blind rivet nut with pulling mandrel is preferably constructed such that the cap screw extends completely over the portion of the rivet tube containing the thread in the prefitted state while allowing a clearance between the screw cap and the flange for gripping by the setting tool. With this design, therefore, there is adequate clearance between the screw cap and the flange after the setting of the blind rivet nut for a component gripped by the cap screw to be fastened on the workpiece by the cap screw being turned into the set blind rivet nut.

BRIEF DESCRIPTION OF THE DRAWINGS

In order that the invention be better understood, a preferred embodiment will now be described in greater detail by way of example with reference to the accompanying drawings in which.

DETAILED DESCRIPTION OF DRAWINGS AND PREFERRED EMBODIMENT

Figure 1:
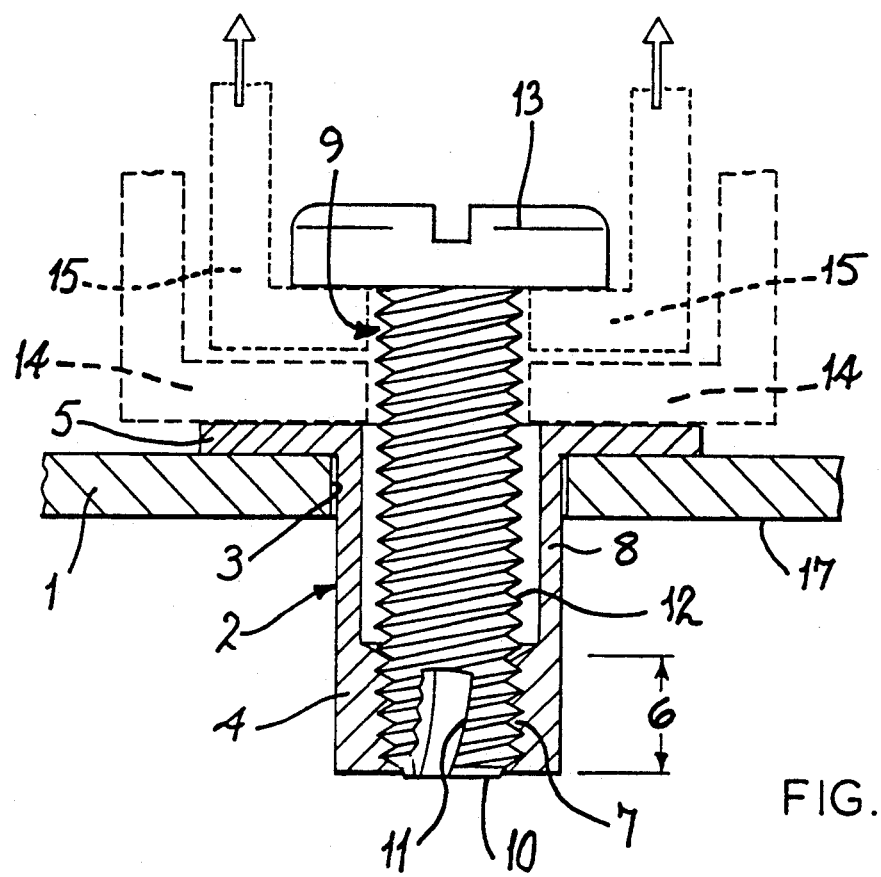
FIG. 1 shows in section the blind rivet nut inserted into a workpiece with prefitted pulling mandrel in the unset state.

FIG. 1 shows the workpiece 1 which consists of a sheet metal plate and into which the blind rivet nut 2 is inserted, more specifically in its original state prior to deformation by the setting process. The hole 3 is worked into the workpiece 1 to receive the blind rivet nut 2. The blind rivet nut 2 consists of the rivet tube 4 and the flange 5 resting on the workpiece 1. On the side of the rivet tube 4 remote from the flange 5, the rivet tube 4 has a portion 6 in which an internal thread 7 is formed. Adjacent to the portion 6 the rivet tube 4 consists of the clinch zone 8 of which the internal diameter corresponds to the base of the internal thread 7. This internal diameter of the clinch zone 8 can also be enlarged relative to the base of the internal thread 7, producing a thinner wall of the rivet tube 4 for the clinch zone 8 than in its portion 6. The deformability of the material of the blind rivet nut 2 consisting of metal, in particularly of deformable steel or, for example, of aluminium, is decisive for this.

Into the blind rivet nut 2 there is turned the cap screw 9 which is to be used as a pulling mandrel, constructed here as a self-tapping screw and is provided on its end face 10 with the cutting edge 11 for this purpose. This is a known design of a self-tapping screw. The thread 12 of the self-tapping screw consequently fits exactly into the internal thread 7 of the rivet tube 4 and is therefore secured thereby. The cap screw 9 is provided with the cap 13 serving as an abutment for a setting tool during the setting process described hereinbelow.

This unified assembly of rivet nut and cap screw is then ready to be inserted as a unit into the workpiece 1.

Within the automotive industry especially, as well as in other production processes, fastener parts or assemblies are commonly manufactured in quantity by a supplier, transported to a manufacturing plant where they will be used, and then delivered to a point of use through production machinery which usually involves a vibrating mechanism for separating and properly orienting the fasteners. In the course of such handling, transporting and vibrating, conventional screws placed in pre-threaded bores are not under tension and therefore can rotate. As a consequence, the screws may become separated from the associated part or, in the particular case of a blind rivet, may move relative to the rivet flange. This can cause either failure of the pulling tool jaws to locate the screw cap or, if the screw has moved relative to the rivet flange, improper rivet set due to inadequate clinching. A particular advantage of the assembly of this invention is that the self-tapping screw, when it is driven into the portion 6 of the rivet, creates the internal thread 7 in the portion 6 by forcing metal to move out of the path of the tip threads. Thus, as previously noted, the thread 12 of the self-tapping screw fits exactly into the internal thread 7. Due to the high frictional engagement between threads 12 and 7 during this stage of the process, it is difficult to move the screw 9 relative to the rivet 4. Accordingly, the unified assembly of this invention overcomes the abovementioned disadvantages of movement during handling, transport and vibration.

For setting the blind rivet nut 2 shown in FIG. 1 with cap screw 9, a known setting tool, which is not of interest as such in this connection, with the pressure pieces 14 and the claws 15 is put on such that the pressure pieces 14 press against the flange 5 while the claws 15 gripping behind the cap 13 exert a pulling force thereon in the direction of the arrow indicated. The pressure pieces 14 and the claws 15 each surround the shank of the cap screw 9 but it is not necessary to clamp the shank of the cap screw 9. It is merely necessary for the two claws 15 to grip sufficiently far behind the cap 13 so as not to slide off it when the pulling force is exerted.

Figure 2:
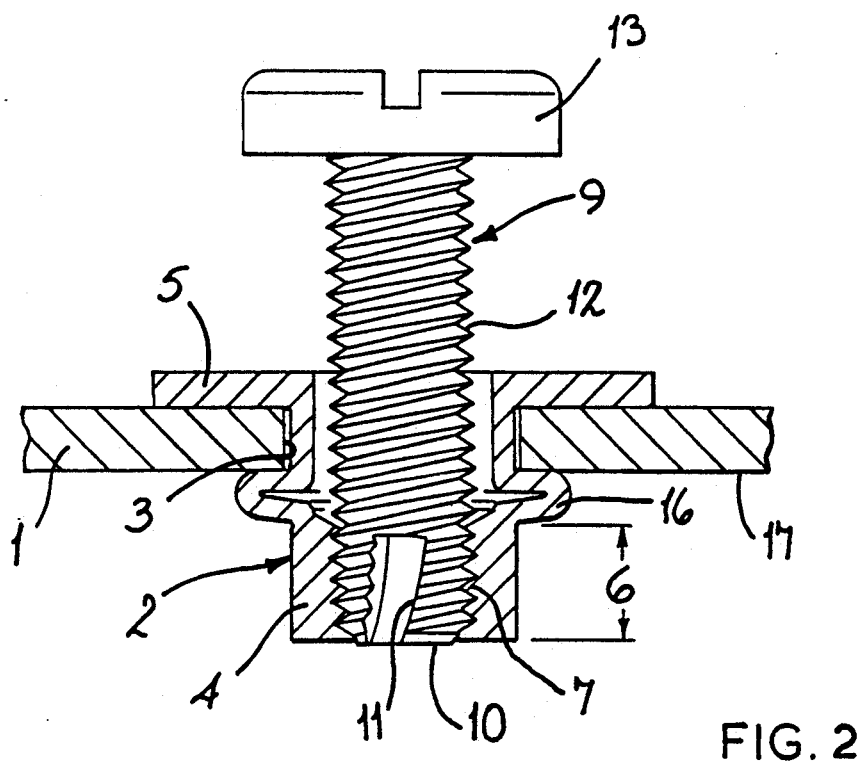
FIG. 2 shows in section the blind rivet nut of FIG. 1 after setting operation.

Owing to the pulling force exerted on the claws 15, the clinch zone 8 is clinched on the side of the workpiece 1 remote from the flange 5, forming the enlargement 16 which is shown in FIG. 2, rests firmly against the underside 17 of the workpiece 1 owing to the pulling force acting on the portion 6 and therefore clamps the workpiece 1, together with the flange 5. The blind rivet nut 2 is therefore set and riveted to the workpiece 1, the internal thread 7 of the tube 4 remaining undeformed as it is held adequately by the respective turns of the thread 12 of the cap screw 9.

Owing to this setting process there exists on the workpiece 1 a fastening means which consists of set rivet tube 2 and cap screw 9 and with which any part fitting beneath the cap 13 can be screwed on the workpiece 1 by turning in the cap screw 9, which part may previously have been attached on the cap screw 9 at this point in the sense of a pre-fitting process. However, it is also possible to screw out the cap screw 9 after the setting of the blind rivet nut 2 and to turn another suitable screw in to the blind rivet nut 2, for example a substantially longer or shorter screw.

The cap screw 9 shown in FIG. 1 can also project with its end face 10 from the lower end of the rivet tube 4. When the cap screw 9 is turned further into the set blind rivet nut 2 according to FIG. 2 to screw a further part onto the workpiece 1, this is clearly so.

We claim:

1. A blind rivet assembly adapted to be inserted into a workpiece and pulled from one side to set the rivet comprising:

a rivet comprising a flange at one end and a tube with an internal bore extending from said flange, said tube comprising a first clinching portion adjacent said flange and a second portion;

a pulling mandrel for said rivet, said mandrel comprising a head adapted to be engaged by a pulling tool, a threaded portion extending through said clinching portion of said rivet and a self-tapping tip having a cutting edge thereon, said tip being in tight frictional engagement with the surface of threads formed within said second portion during the entry of said tip into said second portion so as to resist movement of said pulling mandrel during handling, transporting and vibration of said assembly prior to installation thereof;

said pulling mandrel head and said threaded portion being adapted to attach at least one additional component to said workpiece after setting of said rivet.

2. A blind rivet assembly as claimed in claim 1 wherein said head of said pulling mandrel is maintained at a preselected distance from said flange of said rivet until delivery of said assembly to said workpiece.

3. A blind rivet assembly as claimed in claim 1 wherein said pulling mandrel extends to the end of said internal bore in said second portion of said rivet so that at least said self-tapping tip is fully engaged with said surface in said second portion.

4. A method of making a stable blind rivet assembly for use in a manufacturing process which includes vibrational delivery comprising the steps of:

providing a blind rivet having a flange at one end, a tube with an internal smooth bore at the other end and a thin walled clinching portion extending therebetween;

providing a pulling mandrel comprising a head portion with an engagable surface facing said rivet flange, a threaded stud portion extending from said engagable surface and a self-tapping tip at the end of said stud portion, the length of said pulling mandrel exceeding the length of said rivet by an amount at least equal to the depth of a rivet-setting pulling jaw; and inserting said pulling mandrel into said rivet so that said self-tapping tip forms internal threads in said tube, said pulling mandrel being rotated into said tube until said self-tapping tip is completely within said tube.

5. A method of providing a set blind rivet assembly in a workpiece wherein the pulling mandrel for said blind rivet serves as a screw-threaded removable and replaceable fastener in said blind rivet comprising:

performing the steps of providing a blind rivet assembly as claimed in claim 4;

pulling said mandrel to set said rivet; and removing and replacing said pulling mandrel in said blind rivet as necessary to attach at least one additional component to said workpiece.

* * * * *